US012636858B2

(12) United States Patent
Orvis et al.

(10) Patent No.: US 12,636,858 B2
(45) Date of Patent: May 26, 2026

(54) IN-MOLD COMPOSITE SURFACING FILM

(71) Applicant: Akzo Nobel Coatings International B.V., Amsterdam (NL)

(72) Inventors: Eric Orvis, Royal Oak, MI (US); Matthew Paul Amick, Macomb, MI (US)

(73) Assignee: Akzo Nobel Coatings International B.V., Amsterdam (NL)

( * ) Notice: Subject to any disclaimer, the term of this patent is extended or adjusted under 35 U.S.C. 154(b) by 1139 days.

(21) Appl. No.: 17/635,188

(22) PCT Filed: Aug. 26, 2020

(86) PCT No.: PCT/EP2020/073816
§ 371 (c)(1),
(2) Date: Feb. 14, 2022

(87) PCT Pub. No.: WO2021/037889
PCT Pub. Date: Mar. 4, 2021

(65) Prior Publication Data
US 2022/0289918 A1 Sep. 15, 2022

Related U.S. Application Data

(60) Provisional application No. 62/891,675, filed on Aug. 26, 2019.

(30) Foreign Application Priority Data

Sep. 26, 2019 (EP) ..................................... 19199937

(51) Int. Cl.
B32B 7/12 (2006.01)
B32B 5/02 (2006.01)
(Continued)

(52) U.S. Cl.
CPC ................. B32B 7/12 (2013.01); B32B 5/024 (2013.01); B32B 5/26 (2013.01); B32B 7/06 (2013.01);
(Continued)

(58) Field of Classification Search
CPC .. B32B 7/12; B32B 5/024; B32B 5/26; B32B 7/06; B32B 27/08; B32B 27/12; B32B 27/20; B32B 27/40; B32B 2307/748
(Continued)

(56) References Cited

U.S. PATENT DOCUMENTS 5,158,712 A * 10/1992 Wilhelm ........... B01F 25/43151
261/79.2
5,677,045 A * 10/1997 Nagai ................. H05K 1/0373
174/148
(Continued)

FOREIGN PATENT DOCUMENTS

EP 1025176 A1 8/2000
JP H03114729 5/1991
(Continued)

OTHER PUBLICATIONS

JAMORIN International (Year: 2019).*
(Continued)

*Primary Examiner* — Betelhem Shewareged
(74) *Attorney, Agent, or Firm* — Pauly, DeVries Smith & Deffner LLC

(57) ABSTRACT

This disclosure relates to an in-mold surfacing film for structural composites, in the form of a thermally curable multi-layer film comprising: (a) a release carrier, (b) a surfacing film layer overlying the release carrier, wherein the surfacing film layer comprises an OH-functional polyurethane and a thermally activatable curing agent which can react with the OH groups at a temperature higher than 120°
(Continued)

C., and (c) a release liner. Also disclosed is a method for preparing a composite article in-mold using a prepreg and the multi-layer film.

11 Claims, 2 Drawing Sheets

(51) Int. Cl.

| | |
|---|---|
| *B32B 5/26* | (2006.01) |
| *B32B 7/06* | (2019.01) |
| *B32B 27/08* | (2006.01) |
| *B32B 27/12* | (2006.01) |
| *B32B 27/20* | (2006.01) |
| *B32B 27/40* | (2006.01) |

(52) U.S. Cl.
CPC ............. *B32B 27/08* (2013.01); *B32B 27/12* (2013.01); *B32B 27/20* (2013.01); *B32B 27/40* (2013.01); *B32B 2307/748* (2013.01)

(58) Field of Classification Search
USPC ........................................................ 428/352
See application file for complete search history.

(56) References Cited

U.S. PATENT DOCUMENTS

| | | | | |
|---|---|---|---|---|
| 5,965,256 A | * | 10/1999 | Barrera ................. | B05D 5/083 |
| | | | | 427/508 |
| 9,790,318 B2 | | 10/2017 | McGuire, Jr. et al. | |
| 10,357,909 B2 | | 7/2019 | Hicks et al. | |

| | | | | |
|---|---|---|---|---|
| 2004/0071916 A1 | * | 4/2004 | Romanowski | .......... B32B 27/08 |
| | | | | 428/40.1 |
| 2012/0160402 A1 | | 6/2012 | Ho et al. | |
| 2013/0230716 A1 | * | 9/2013 | Schmidt | ................ B29C 70/086 |
| | | | | 428/221 |
| 2014/0113115 A1 | | 4/2014 | Ito et al. | |
| 2016/0023243 A1 | | 1/2016 | Amick et al. | |
| 2016/0362832 A1 | * | 12/2016 | Murahara | ................ D06N 3/14 |
| 2020/0324514 A1 | | 10/2020 | Javier et al. | |
| 2021/0016553 A1 | | 1/2021 | Brei et al. | |
| 2022/0289918 A1 | * | 9/2022 | Orvis | ......................... C08J 5/04 |

FOREIGN PATENT DOCUMENTS

| | | | |
|---|---|---|---|
| JP | 2011-517630 | A | 6/2011 |
| JP | WO2012/176742 | A1 | 12/2012 |
| JP | 2017031301 | A | 2/2017 |
| JP | 2018092965 | A | 6/2018 |
| RU | 111775 | U1 | 12/2011 |
| WO | WO99/19414 | A1 | 4/1999 |
| WO | 2009/120548 | A2 | 10/2009 |

OTHER PUBLICATIONS

English Translation of JP2017031301A.
English Translation of JP2018092965A.
"Office Action," for Japanese Patent Application No. 2024-015278 mailed Nov. 12, 2024, 14 pages.
European Search Report of Corresponding Application No. EP 19199937.4, dated Apr. 20, 2020.
International Search Report of Corresponding Application No. PCT/EP2020/073816, mailed Nov. 20, 2020.

* cited by examiner

IN-MOLD COMPOSITE SURFACING FILM

CROSS-REFERENCE TO RELATED APPLICATIONS

This application is a 35 U.S.C. § 371 national phase application of International Application No. PCT/EP2020/073816 (published as WO 2021/037889 A1), filed on Aug. 26, 2020, which claims the benefit of priority to U.S. application Ser. No. 62/891,675, filed on Aug. 26, 2019, and EP Application No. 19199937.4, filed on Sep. 26, 2019, each of which is incorporated herein by reference in its entirety.

FIELD OF THE INVENTION

The present invention relates to a thermally curable multi-layer film to be used as an in-mold surfacing film for structural composites, methods of its manufacture, and its use in structural composites.

BACKGROUND

Structural parts like an airplane wing are often made from fiber-reinforced composites, which have gained popularity due to their light weight, high strength and excellent insulation properties. Such composite articles are typically prepared by molding starting from a prepreg—an intermediate product containing a reinforcing material (carbon fiber or fiber glass) and a resin, usually epoxy resin. Since the resin is not fully cured, the prepreg can easily conform to the shape of the mold. The resin undergoes the final cure at a high temperature in the mold.

After cure, the surface of the composite is normally not smooth enough due to the underlying fiber structure and requires filling and sanding prior to topcoat application. Surfacing films can be used to cover the surface of prepregs and co-cure in the mold to achieve a smooth surface. Typically, the same resin as in the prepreg is used for the surfacing film, in the form of a fiberless or fiber carrier backed "resin-rich" uncured resin film.

Known surfacing films are based on epoxy-amine chemistry. Disadvantages of known surfacing films include low UV resistance, which means that the composites still need to have proper primer and topcoat coatings to protect the underlying composite against UV degradation. Another disadvantage is limited shelf life. Known epoxy-amine surfacing films are uncured and require cold storage (i.e. below 0° C.) to achieve long shelf life. At ambient conditions these films would prematurely cure. A further disadvantage of epoxy-amine surfacing films is high hardness when cured ($T_g \leq 150°$ C.), which means they need aggressive sanding to achieve proper adhesion. Yet a further disadvantage of epoxy-amine surfacing films is their tendency for cold flow. Since the films are a mass of uncured resin, they tend to flow after they are removed from frozen storage and brought up to ambient conditions. If the rolls are left upright or against a sharp surface, this will cause the uncured resin to flow out and create voids or uneven film thickness in the material.

It is desired to provide a multi-layer film, which can be used as an in-mold composite surfacing film, which is devoid of the above disadvantages. Preferably, the multi-layer film has a long shelf life at ambient conditions and excellent UV stability. It is further desired that the multi-layer film has a high chemical resistance and high resistance to thermal and moisture induced cracking. It is also desired that the multi-layer film does not exhibit significant cold or melt flow.

SUMMARY OF THE INVENTION

In order to address the above-mentioned desires, the present disclosure provides, in a first aspect, a thermally curable multi-layer film comprising:
(a) a release carrier,
(b) a surfacing film layer overlying the release carrier, wherein the surfacing film layer comprises an OH-functional polyurethane, and a thermally activatable curing agent, which can react with the OH groups at a temperature higher than 120° C., and
(c) a release liner.

In another aspect, the present disclosure provides a method for producing the thermally curable multi-layer film of the invention, the method comprising the steps of:
(a) casting the surfacing film layer onto the release carrier,
(b) drying the surfacing film layer, and
(c) laminating the release liner on the side opposite to the release carrier.

In a further aspect, the present disclosure also provides a method for preparing a composite article in-mold using a prepreg and the thermally curable multi-layer film of the invention, comprising the steps of:
(a) removing the release carrier and the release liner from the multi-layer film,
(b) laying up the film in a mold against a tooling side of the mold,
(c) laying up a prepreg over the film,
(d) thermally curing both the prepreg and the film in the mold to form a coated cured composite article, and
(e) taking out the coated cured composite article from the mold.

In yet another aspect, the present disclosure provides a coated, in-mold cured composite article obtained according to the method of the invention.

DETAILED DESCRIPTION

Figure 1:
FIGS. 1-3 show a cross section of multi-layer films according to embodiments of the invention.

The thermally curable multi-layer film according to the present disclosure comprises at least the following layers: a) a release carrier, b) a surfacing film layer overlying the release carrier, and c) a release liner. An example of the build-up if only three layers are present is shown in FIG. 1. In this Figure, the film comprises a release carrier (1), a surfacing film layer (2) and a release liner (3).

Figure 2:
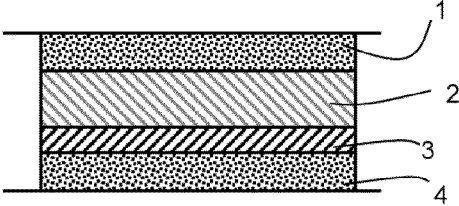
Figure 3:
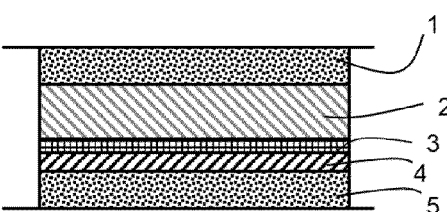

The multi-layer film can further comprise optional layers between the release carrier and the release liner. Examples of these are shown in FIGS. 2 and 3. In FIG. 2, besides a release carrier (1), surfacing film layer (2) and a release liner (4), there is also an optional tack layer (3). In FIG. 3, there is further an optional reinforcement layer (3), present between the surfacing film layer (2) of FIG. 2 and the optional tack layer (4) of FIG. 2. The release carrier (1) and release liner (5) of FIG. 2 are on the outside of the multi-layer film.

The surfacing film layer together with the optional layers, and excluding the release carrier and release liner, is referred to in this description as a "composite surfacing film". Composite surfacing film can hence in some embodiments only consist of a surfacing film layer, and in some embodiments, it can additionally contain further layers. These layers will be described in detail in the below description.

Release Carrier/Liner

Release carrier and release liner are removable carrier sheets. Removable means in this case that they can be removed from the surfacing film layer without damage to that layer.

Release carrier and release liner are used for handling the composite surfacing film and being able to store it in roll. Release carrier is defined as the film layer onto which the liquid surfacing film layer is cast and dried. The release liner is at the opposite outer side from the release carrier. Release liner serves as an interleaf of the composite surfacing film to prevent blocking (sticking to itself). In some cases, the release liner can be the carrier for the optional tack layer in the production of the multi-layer film.

The release carrier and release liner are preferably thermally stable, non-elastomeric and non-stretchable at room temperature. Both clear and colored film types can be used. Colored types can be preferred to indicate to the user the difference between a release film and the surfacing film when the surfacing film is transparent.

The material for the release carrier and the release liner can be the same or different and is not particularly important in the present disclosure. Suitable release carrier and release liners include polyester films e.g. polyethylene-terephthalate (PET), or polyolefin films e.g. polypropylene (PP), or other polymer known films. PET is particularly preferred as a release carrier since PET films are very heat stable and stay flat during film casting and curing even at higher temperatures. An example of a suitable release carrier is REL 8752, which is a silicon-coated release PET film from St. Gobain.

Polypropylene films are preferred as a release liner since they typically have low surface energy and offer easy release from the partially cured surfacing film. An example of a suitable release liner is biaxially oriented polypropylene (BOPP), e.g. available from Toray plastics under the Torayfan® brand name.

Also release agent-free release films such as those commercially available under the name Flex$^{PLAS}$ from IFAM are suitable. An advantage of such films when used as a release carrier is that it can stay in the mold and serve as the mold release agent, eliminating the need to apply liquid mold release agents.

Surfacing Film Layer

The surfacing film layer is the layer that is thermally curable. It comprises an OH-functional polyurethane and a thermally activatable curing agent, which can react with the OH groups at a temperature higher than 120° C. The surfacing film is hence only partially cured, since it contains free OH groups and a curing agent, which only becomes active at higher temperatures. Despite that it is partially cured, the film has enough integrity to handle and lay-up without too much risk to initiate the secondary reaction. The partially cured film is stable in roll form and will not continue to slowly react at ambient conditions.

The surfacing film layer preferably has a thickness 25-125 μm, more preferably 35-75 μm. Film thickness (also called film build) can be measured by a coating thickness gauge, e.g. Elcometer® equipment backed by steel or aluminium. When the thickness is too high, the film can become too heavy for certain applications (e.g. aerospace).

Film thickness can also be measured in terms of weight film/coating per area via gravimetric analysis. A 5 cm×5 cm square is cut from the film, the release carriers are removed, and then the film is weighed on an analytical balance. The measurement is converted to g/m². The surfacing film layer preferably has an area film weight 59-136 g/m².

Glass transition temperature $T_g$ of the surfacing film after casting is preferably in the range 0-35° C., more preferably in the range 0-30° C., yet more preferably in the range 5-20° C. Below 0° C. the handling of the film becomes poor as it easily sticks to itself. Much above 35° C. the tack to the tooling plate and the prepreg can be not high enough.

Glass transition temperature $T_g$ is determined by modulated differential scanning calorimetry (m-DSC). This can be done with TA Instruments Q2000, done in modulation option, with an amplitude of 1° C., a period of 40 seconds and an underlying heating range of 5° C/min. Helium is used as purge gas at a flow of 50 ml/min. Standard two runs are performed (at once after each other in one method), the second run is used for the $T_g$ reporting.

Preferably, the surfacing film layer has a tensile yield strength of 2.5-4.0 MPa. The surfacing film layer preferably has a maximum tensile strength at break of at least 7 MPa, preferably 8-10 MPa. The elongation at break is preferably in the range 70-100%. Tensile strength is measured according to ASTM D882 using an Instron tensile tester. At room temperature, the surfacing film layer preferably exhibits viscoelastic behavior (elastic recovery below the yield strength) with a brittle failure at the break point.

The surfacing film layer according to the present disclosure preferably does not show any fluid behavior at lower temperatures, e.g. at 82° C. or any elevated temperature up to the onset of cure temperature at 170-180° C., as measured by m-DSC. Melt viscosity was measured at 82° C. according to ASTM D445.

The surfacing film layer preferably shows very low UV transmission. UV transmission and reflectance are measured using a UV/Vis spectrophotometer at wavelengths of 280 nm-800 nm. The surfacing film layer according to the disclosure preferably shows 0% transmission over the entire wavelength range.

OH-functional polyurethane

The OH-functional polyurethane is a polyurethane having reactive OH groups in an amount sufficient for the reaction with the thermally activatable curing agent at a temperature above the activation temperature. Preferably, the polyurethane has an OH (hydroxyl) value of at least 20, at least 30, at least 50, or at least 60 mg KOH/g. Preferably, the hydroxyl value does not exceed 200, or 180, or 160 mg KOH/g. The hydroxyl value is preferably in the range 30 - 180 mg KOH/g, more preferably 70 -150 mg KOH/g. The hydroxyl value can be measured by potentiometric titration according to ASTM E1899-08. The method is based on the reaction of the primary and secondary hydroxyl groups with excess p-toluenesulfonyl isocyanate (TSI) with the formation of an acidic carbamate. The latter can then be titrated with the strongly basic tetra-n-butylammonium hydroxide solution (TBAOH) under non-aqueous conditions.

The OH-functional polyurethane preferably does not possess reactive unsaturated bonds (double bonds). The iodine value of the polyurethane is preferably less than 1 g $I_2$/100g resin, more preferably 0. Iodine value can be determined by addition of iodine chloride and back-titration with sodium thiosulphate by DIN 53241-1:1995-05.

The OH-functional polyurethane can be prepared from at least one polyol and at least one polyisocyanate. "A polyol" means any compound with at least two reactive hydroxyl (OH) groups. "A polyisocyanate" means any compound with at least two reactive isocyanate (NCO) groups.

Preferably, the polyols are OH-functional compounds with a high OH value. It is important that during the reaction with the polyisocyanate there is an excess of OH groups, so that sufficient amount of OH groups remains available for the second, high temperature curing step during in-mold composite cure. Preferably, the OH value of the polyol is at least 40, more preferably at least100, or at least 140, or at least 180 mg KOH/g. More preferably, the OH number is in the range 200-500, more preferably 240-400 mg KOH/g. The hydroxyl (OH) value can be determined as mentioned above.

Since not all initially available OH groups of the polyols react with the polyisocyanate, the polyurethane is only partially cured. The polyurethane is finally cured with the high temperature curing agent in a second step, which takes place in the mold.

The polyols preferably have a weight-average molecular weight $M_w$ in the range 1,000-10,000 g/mol. Molecular weight can be determined by means of gel permeation chromatography (GPC) analysis with tetrahydrofuran (THF) (+0.1% acetic acid) as eluent (1 ml/min) on a styrene-divinylbenzene column combination. Calibration is carried out using polystyrene standards.

Preferably, the OH-functional polyurethane is prepared from a polyester polyol or from a fluoroethylene vinyl ether.

In some embodiments, particularly suitable polyols are polyester polyols. Polyester polyols can be obtained by polycondensation of at least one polyfunctional carboxylic acid or anhydride and at least one polyhydric alcohol.

Examples of suitable polycarboxylic acids include tetra-hydrophthalic acid, hexahydrophthalic acid, methyl hexa-hydrophthalic acid, 1,4-cyclohexane dicarboxylic acid, 1,3-cyclohexane dicarboxylic acid, phthalic acid, isophthalic acid, terephthalic acid, 5-tert. butyl isophthalic acid, maleic acid, fumaric acid, succinic acid, hydroxy succinic acid, glutaric acid, adipic acid, azelaic acid, anhydrides thereof and mixtures thereof.

Suitable polyhydric alcohols include low molecular weight, short-chain aliphatic, cycloaliphatic diols, triols and higher polyols, where the term short-chain implies the number of carbon atoms from 2 to 20. Examples of diols are ethylene glycol, diethylene glycol, triethylene glycol, tetra-ethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, cyclohexanediol, 1,4-cyclohexanedi-methanol, 1,6-hexanediol, 1,2- and 1,4-cyclohexanediol, 2,2-dimethyl-3-hydroxypropyl 2,2-dimethyl-3-hydroxypro-pionate. Examples of suitable triols are trimethylolethane, trimethylolpropane, and glycerol. Suitable alcohols of higher functionality of ditrimethylolpropane, pentaerythri-tol, dipentaerythritol, and sorbitol. Preference is given to aliphatic diols, and very particular preference is given to cycloaliphatic diols.

In some embodiments, the polyester polyol is a saturated polyester polyol. Such polyols are known and commercially available, e.g. under the Setal® product series from Allnex.

In some embodiments, it can be preferred that the poly-ester polyols have a high degree of branching. This can be done by using monomers with a higher functionality which promote branching, or monomers with a branched structure. Examples of higher functional monomers are trimethylol propane and trimellitic anhydride. Examples of branched monomers include isooctanoic acid, isodecanoic acid, isononanoic acid, isotridecanoic acid and versatic acid. Amount of such monomers is preferably at least 1 wt. %, more preferably in the range 5-60 wt. %, more preferably 10-30 wt. %, based on the total weight of the monomer mixture. Inventors believe that higher degree of branching contributes to higher crosslink density and harder films.

In certain embodiments, the polyol can be an OH-func-tional fluoropolymer, more preferably a fluoro-containing polyvinyl ether. Such polyols can especially be useful when the multi-layer film needs to have low flammability prop-erties, e.g. in aerospace interior applications. Particularly suitable are fluoroethylene vinyl ethers (FEVE), which are copolymers with alternating fluoroethylene and vinyl ether units, having functional pending groups including OH groups.

The fluoroethylene vinyl ether preferably has a fluorine content in the range 10-50 wt. %, more preferably 20-40 wt. %. The OH value of the fluoroethylene vinyl ether can be in the range 40-250 mg KOH/g. The acid value is preferably in the range 0-15 mg KOH/g. Molecular weight Mn can be in the range 15,000-1,000,000.

Examples of FEVE include the Lumiflon® product range by Asahi Glass Chemicals Company, e.g. Lumiflon FD-1000, Lumiflon FE-4300, Lumiflon LF-200, Lumiflon LF-600X, Lumiflon LF710F, Lumiflon LF916F.

Suitable polyisocyanates for the reaction with the polyols include aliphatic, cycloaliphatic or aromatic di-, tri- or tetra-isocyanate and mixtures thereof. Examples of diiso-cyanates include 1,2-propylene diisocyanate, trimethylene diisocyanate, tetramethylene diisocyanate, hexamethylene diisocyanate (HDI), 2,2,4-trimethyl hexamethylene diiso-cyanate, 1,2-cyclohexane diisocyanate, 1,4-cyclohexane dii-socyanate, isophorone diisocyanate (IPDI), α,α,α',α'-te-tramethyl xylylene diisocyanate (TMXDI®), 3,3'-dimethyl-4,4'-diisocyanato-diphenylmethane, and diisocyanatonaphthalene. Examples of triisocyanates include 1,3,5-triisocyanatobenzene, 2,4,6-triisocyanatotolu-ene, 1,8-diisocyanato-4-(isocyanatomethyl) octane, and lysine triisocyanate. Adducts and oligomers of polyisocya-nates, for instance biurets, isocyanurates, allophanates, imino-oxadiazinediones, uretdiones, urethanes, and mix-tures thereof are also included.

In some embodiments, it can be preferred to use a catalyst for the addition reaction of isocyanate groups and hydroxyl groups. Known catalysts suitable for polyurethane reaction can be used, e.g. metal-based catalysts, particularly tin compounds. The catalyst is generally used in an amount of 0.001 to 10 weight-%, preferably 0.002 to 5 weight-%, more preferably in an amount of 0.01 to 1 weight-%, calculated on the non-volatile matter of the coating composition. Suitable metals in the metal-based catalyst include zinc, cobalt, manganese, zirconium, bismuth, and tin. It is preferred that the coating composition comprises a tin based catalyst. Well-known examples of tin based catalysts are dimethyl tin dilaurate, dimethyl tin diversatate, dimethyl tin dioleate, dibutyl tin dilaurate, dioctyl tin dilaurate, and tin octoate. Also suitable are dialkyl tin mercaptides, dialkyl tin maleates, and dialkyl tin acetates. It is also possible to use mixtures and combinations of metal-based catalysts.

In some embodiments, the polyisocyanate can be a par-tially blocked polyisocyanate. "Partially blocked" means that it contains both unblocked isocyanate groups available for immediate reaction and blocked isocyanate groups (with either a blocking agent or internally), which only become reactive at a higher temperature. It is believed that partially blocked isocyanates promote a single network formation, without floating blocked components.

Partially blocked polyisocyanates are known and are available commercially, e.g. Desmodur® N3400 isocyanate (partially blocked internally by uretdione to have a blocked/unblocked NCO ratio of approximately 40:60) available from Covestro.

Preferably, the weight ratio of blocked to unblocked NCO groups is in the range 0.1-20, preferably 0.5-10. This refers to the total amount of NCO groups present in the surfacing film layer.

In some embodiments, it is preferred that the surfacing film layer and the composite surfacing film (if there are more layers) is only thermally curable, which means that full cure can only be achieved thermally. This excludes films which need dual cure—e.g. thermally and by radiation.

Thermally Activatable Curing Agent

The thermally activatable curing agent is able to react with the OH groups of the OH-functional polyurethane at a high temperature, particularly, at a temperature higher than 120° C. "Thermally activatable" means that there is substantially no chemical reaction between the curing agent and the OH-functional polyurethane at a temperature below the activation temperature.

In some embodiments, the thermally activatable curing agent comprises a blocked polyisocyanate. Blocked polyisocyanates contain isocyanate groups that are blocked by a blocking agent, such as ε-caprolactam, butanone oxime, phenol or dimethyl pyrazole. At room temperature, these blocked polyisocyanates do not react with polyols at any appreciable rate. At elevated temperature the blocked polyisocyanate liberates the blocking agent, which may leave the film and the polyisocyanate reacts with the polyol. Isocyanate can also be blocked without the use of a blocking agent, e.g. by formation of uretdione groups. This can be advantageous since deblocking of the NCO groups does not yield any organic compounds. This is particularly preferred when curing is done in an autoclave.

Commercially available blocked isocyanates include Desmodur® BL products such as BL-350, BL-3175A, BL-4265, and Crelan® products, such as Crelan NI 2 (ε-caprolactam blocked IPDI prepolymers), Crelan NW 5 (c-caprolactam blocked Desomodur W prepolymers), Crelan VPLS 2256 (c-caprolactam blocked IPDI isocyanaurate), Crelan EF 403 (emission-free crosslinker based on an IPDI uretdione), all available from Covestro. Particular blocked isocyanate can be selected based on the desired unblocking temperature. Unblocking of ε-caprolactam starts at 176° C., unblocking of uretdione at 137° C.

The polyisocyanate used as a curing agent can also be a partially blocked polyisocyanate, as described above for the polyisocyanate used for the first step of the polyurethane formation.

The polyisocyanate is preferably present in an amount to achieve an overall NCO:OH molar ratio of 0.9:1 to 2.0:1.

In some other embodiments, the thermally activatable curing agent can comprise an amino resin, preferably a melamine-formaldehyde resin. Such resins are known and commercially available, e.g. Cymel® product range by Allnex, particularly Cymel 300, Cymel 301, Cymel 350, Cymel 3745, Cymel MM-100 resins. Melamine-formaldehyde resins typically react at temperatures higher than 120° C. Amino resins are typically used in an amount 20-40% based on the resin solids.

Other Ingredients

The surfacing film layer can further comprise a catalyst for catalyzing the reaction between the OH-functional polyurethane and the thermally activatable curing agent. The catalyst can be any catalyst known in the art for the reaction between the OH groups and the reactive groups in the curing agent. Preferably, the catalyst is a metal catalyst. The catalyst can be present in an amount of 0.01-5 wt. %, more preferably 0.1-1 wt. %, based on the total weight of the surfacing film. In case the curing agent comprises a polyisocyanate, the catalyst is preferably the same as the catalyst described above for the polyurethane formation.

The solids level of the surfacing film is preferably at least 90 wt. %, at least 95 wt. %, or more preferably at least 98 wt. %, based on the total weight of the surfacing film.

The surfacing film layer may further comprise conventional additives including pigments, fire retardants, UV stabilizers, fillers, plasticizers, antioxidants, deaerators, slip additives, adhesion promoters, thickeners, and waxes. In some embodiments, the surfacing film layer may comprise conductive pigments or fillers in order to provide the cured composite material with a conductive primer layer for anti-static properties, EMI (electromagnetic interference) shielding, or for electrostatic application of topcoats.

In some embodiments, the surfacing film layer can be transparent. This can be achieved by avoiding the use of pigments or fillers. In that case, the whole surfacing film, including other layers which will be retained on the prepreg and excluding the removable layers, is transparent. Transparent surfacing films can be advantageous in applications where it is desired to make the underlying pattern of the prepreg visible.

Optional Layers

In some embodiments, the composite surfacing film may further comprise optional layers.

An example of such a layer is a tack layer overlying the surfacing film layer (b) on the side opposite to the release carrier (a), see FIG. 2.

Tack layer is meant to provide a tacky surface to the surfacing film. The tacky surface allows for better positioning and handling of the surface film against the tool surface pretreated with a release agent or against the prepreg layers so that the composite surfacing film will stick and hold itself to these surfaces during the lay-up process.

The glass transition temperature $T_g$ of the tack layer is preferably 0° C. and below, e.g. in the range from −10° C. to 0° C. A skilled person is able to select binder resins and curing agents to arrive to the desired low $T_g$ for the tack layer.

In some embodiments, the tack layer can also comprise an OH-functional polyurethane and a thermally activatable curing agent, which may be the same or different from those used in the surfacing film layer.

In a preferred embodiment, the tack layer is prepared from the same binder resins and/or same curing agents as the surfacing film layer described above, but in a different combination or a weight ratio so as to arrive to the desired lower $T_g$. This means that the composite surfacing film comprises two layers based on a OH-functional polyurethane and a curing agent, but with different glass transition temperatures $T_g$.

In some embodiments, it can be desired to have a reinforcement layer as an additional layer, e.g. containing a scrim fabric. Scrim fabrics are well known and widely used in composite manufacturing for reinforcement and improved handling. Both woven and nonwoven fabrics can be used with fiber compositions including polyester, glass, cellulose, polyolefin, carbon, nylon, and other thermoplastics. It is advantageous to use a thin and light weight scrim fabric so as not to significantly increase the thickness or weight of the overall surface film. The preferred basis weight of the reinforcement layer should be in the range of 4-25 g/m². In some embodiments, the scrim fabric may comprise nonwoven polyester.

Such scrim fabrics can be laminated to one of the composite surfacing film layers to provide reinforcement to the surface film. One or more additional surfacing film layers can be provided on the scrim fabric on the side opposite the first surfacing film layer. With the embedded scrim fabric, the surface film is less susceptible to tearing or stretching out significantly during manual or automated lay-up processing.

In some embodiments, the scrim fabric can contain a conductive fiber material. Including a conductive scrim fabric in the multi-layer film can advantageously provide the cured composite material with a conductive layer for EMI (electromagnetic interference) shielding or lightning strike protection. Examples of conductive scrim fabrics include carbon or metal coated carbon scrims, e.g. commercially available from Technical Fibre Products.

The multi-layer film can further comprise other optional layers e.g. vacuum metallized layers for conductivity, additional film layers for improved paint strip-ability. Such layers are known in the art and a skilled person would have no difficulty in selecting a suitable layer to be used in the present disclosure.

Multi-Layer Film

The thermally curable multi-layer film is particularly suitable to be used as a co-curable, in-mold surfacing film for composites, which allows to eliminate typical surface defects (e.g. pits, cracks, pinholes) that occur in the composite molding process. The film is designed to be cured at elevated temperatures because of the surfacing film layer which contains a reactive resin (OH-functional polyurethane) and a thermally activatable curing agent.

An additional advantage of the present multi-layer film that it can also serve as in-mold primer. This unique dual function allows to reduce the number of steps in an in-mold composite preparation. In particular, the steps of filling/sanding of the cured prepreg, coating with a primer composition and curing of the primer can be eliminated. This leads to considerable saving in terms of time and energy.

The multi-layer film according to the present disclosure is much easier to work with than "spray-in" coatings and powder and other "resin rich" surfacing films and adhesives. Low melt flow and rapid crosslink formation prevents cracks and blow-outs, and limits migration of the composite resin. The film also has uniform film thickness and consistent appearance in the tooling.

The multi-layer film of the present disclosure is storage stable at room temperature. It does not require cold storage, as many of existing surfacing films based on epoxy-amine chemistry. Shelf-life at room temperature is at least 1 year. The film does not exhibit cold flow or melt flow or reversible melt in the actual composite curing step. This allows for better surfacing since the film in the partially cured state is stiffer and has a higher tensile strength compared to the standard epoxy-amine surfacing films. The film also achieves the desired level of smoothness and composite surfacing at a lower total film thickness and area weight compared to the state of the art. Typical epoxy-amine surfacing films have a thickness between 130 pm to 1 mm thick with an area weight from 150 g/m² to over 1000 g/m². The multi-layer film of the present disclosure preferably has a thickness 25-125 μm, more preferably 35-75 μm. The area weight is preferably 59-136 g/m².

The multi-layer film according to the present disclosure can be handled easily at room temperature. The film can be pre-cut or kit along with the prepreg fiber using an automated cutter or plotter or manual methods. The film is supplied between two liners which should be left on the film during the cutting process.

An additional advantage of the multi-layer film is that it can be used on the bag side of the composite (opposite side of the tooling plate). This allows surfacing and priming and potential finish layer with UV protection of the composite to be on the back side of the composite with no further finishing necessary.

The multi-layer film is not meant to be thermoformed. It is used in flat or slightly curved 2D shape molds and is not meant to be stretched or formed during the layup process. If the mold is a more complex 3D shape, the multi-layer film can be cut or kit into different shapes, which allows the user to lay the film into the tool in several pieces that are overlapped in order to cover the 3D surface.

Preparation of the Multi-Layer Film

The thermally curable multi-layer film according to the present disclosure can be manufactured in different ways.

In the most general form, the method for producing the multi-layer film comprises the steps of (a) casting the surfacing film layer onto the release carrier, (b) drying the surfacing film layer, and (c) laminating the release liner on the side opposite to the release carrier. If there is only one layer of the surfacing film, step (c) will be laminating release liner on the surfacing film layer. If there are other layers overlying the surfacing film, the release liner will be laminated to the top layer that is on the side opposite to the release carrier.

Figure 4:
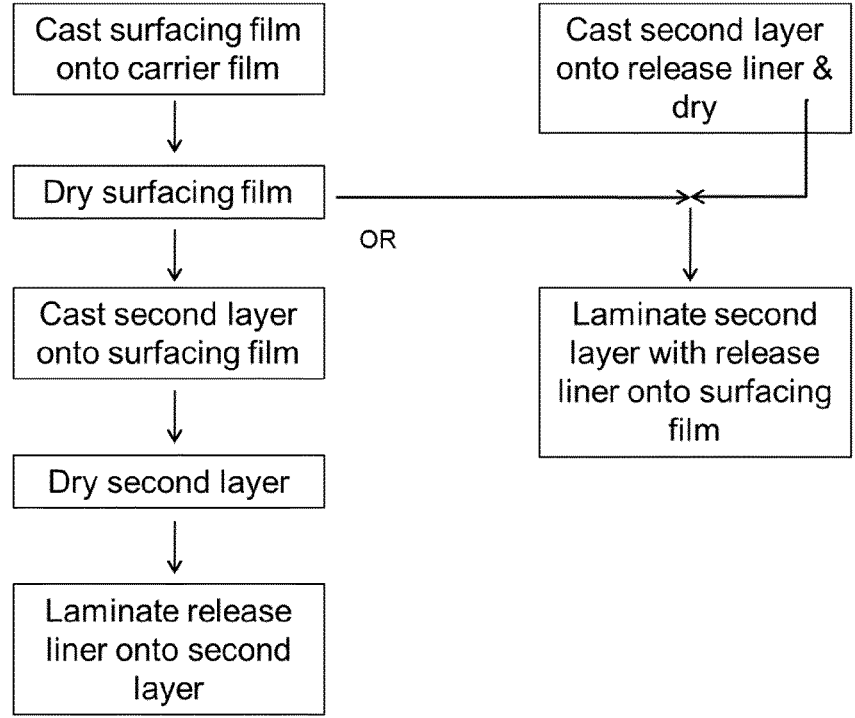
FIG. 4 shows a schematic representation of production steps of a multi-layer film according to an embodiment of the invention.

For example, if the composite surfacing film contains two layers—a surfacing film layer and e.g. an optional tack layer—there could be at least two possibilities to manufacture such a multi-layer film. Two exemplary ways described below are schematically shown in FIG. 4.

In one method, a multi-layer film can be prepared comprising the following steps: (a) casting a first composite surfacing film layer onto the release carrier; (b) drying the first composite surfacing film layer; (c) casting a second composite surfacing film layer onto the dried first composite surfacing film layer, (d) drying the second composite surfacing film layer, and (e) laminating the release liner onto the second composite surfacing film layer.

In another method, the release liner can be used as a carrier for casting the second composite surfacing film layer. Such method would comprise the steps of (a) casting a first composite surfacing film layer onto the release carrier; (b) drying the first composite surfacing film layer; (c) casting a second composite surfacing film layer onto the release liner, (d) drying the second composite surfacing film layer, and (e) laminating the dried second composite surfacing film layer with the release liner onto the dried first composite surfacing film layer with the release carrier. Lamination should be done in the way that the surface of the first layer is laminated onto the surface of the second layer. In that way the release carrier and the release liner are located at the outer surfaces of the multi-layer film and protect the composite surfacing film.

In an analogous way, thermally curable multi-layer films with more layers can be produced. The additional composite surfacing film layers can provide other functions for the surfacing film such as tack, reinforcement, conductivity, or barrier properties.

Casting is a known method to create a polymer film, as an alternative to film extrusion. In casting a polymer solution is applied to a carrier substrate, then the water or solvents are removed by drying in an oven to create a solid layer on the carrier substrate. Preferably, continuous web casting is used.

A skilled person is able to select appropriate conditions and equipment in order to obtain a polymer film by casting. As an example, in the present disclosure, the total thermal cure time can be less than 4 minutes at a temperature 100° C.

In-Mold Preparation of the Composite

The thermally curable multi-layer film can be used in a typical in-mold composite preparation process. Such processes typically comprise the steps of: (a) removing the release carrier and the release liner from the multi-layer film, (b) laying up the film in a mold against a tooling side of the mold, (c) laying up a prepreg over the film, (d) thermally curing both the prepreg and the film to form a coated cured composite article, and (e) taking out the coated cured composite article from the mold. The process results in a coated, in-mold cured composite article.

The thermally curable multi-layer film is preferably used for flat plate or slightly curved 2D molds.

Before laying up in the mold, the film is preferably cut to appropriate size. After this, the release carrier and the release liner are removed. The order in which the release carrier and release liner are removed is not critical to the invention and can depend on the particular in-mold process used. In some cases, both the release carrier and release liner are removed before using in the layup process. In other cases, the release liner can be first removed to expose the optional tack layer. Then the release carrier is removed once the film has been positioned in the mold.

After the release carrier and liner removal the product is placed onto the mold plate, preferably pre-treated with a mold release agent. The tacky side (in case the tack layer is present) can go against the tool surface to hold the film in place during the layup. The required plies of prepreg (carbon) fiber are then laid up onto the product. The assembly product is vacuum bagged and cured according to specification (e.g. 4 hours at 176° C.). The cured panel can be degreased to remove mold release. The film surface can then be lightly sanded to remove any imperfections from the tool surface. The panel can further be coated according to specifications.

In another exemplary lay-up method, only the release liner is removed first after cutting to appropriate size. A stack of prepreg carbon fiber plies is prepared with the tool side ply facing up. The product is placed onto this top ply with the tacky side against the carbon fiber and the release carrier is then removed. The stack is flipped and placed film side down to the mold plate pre-treated with mold release. The assembly product is further vacuum bagged and cured as described above.

A skilled person is able to select appropriate conditions (i.e. time and temperature) and equipment in order to cure the composite together with the surfacing film. The temperature can be selected based on the curing temperature of the prepreg and of the surfacing film. As an example, curing can be done with a cure time of 4 hours at 176° C. Curing can be suitably done in an autoclave.

The thermally curable multi-layer film according to the present disclosure is specifically designed to be used on thermoset fiber-reinforced plastic substrates (prepregs). As a substrate, any reinforced plastic material can be used. The substrate is preferably not thermoformable but thermoset. Typical prepregs contain an uncured mixture of a high functional epoxy resin, amine curing agents and catalysts with a woven fiber reinforcement, like carbon fiber or fiberglass. Glass/phenolic prepregs containing phenol formaldehyde resins can also be used. Suitable substrates include commercially available prepregs from many suppliers, e.g. Solvay, Toray, Hexcel.

The cured surfacing film, after composite cure, preferably has a $T_g$ at least 25° C., more preferably at least 35° C., yet more preferably at least 50° C. Preferably, the $T_g$ is not more than 120° C. In some applications, however, it can be preferred that the cured multi-layer film has a $T_g$ of higher than 120° C., e.g. 120-150° C. The $T_g$ of the cured film can be tuned by the choice of polyols and isocyanates used in the polyurethane preparation, the high temperature curing agent and other additives in the film composition, in order to match with the required temperature for the composite cure and desired film properties in particular applications.

The composite article coated with the surfacing film according to the present disclosure can have many uses, e.g. in aerospace exterior structural composites, aerospace interior composites, but also yacht/marine, automotive, recreational vehicle, other transportation, and sporting goods.

EXAMPLES

Test Procedures

Pencil hardness is measured according to ASTM D3363.

Skydrol® fluid resistance is measured by immersion of a test panel in Skydrol® fluid for 30 days at ambient temperature and measuring pencil hardness before and after the test.

Solvent (chemical) resistance is measured in the same way as Skydrol® fluid resistance but using benzyl alcohol-based paint stripper.

Raw Materials

Polyester 1—saturated polyester polyol with 8.6% OH calculated on non-volatiles, 73-75% non-volatile content, solvent butyl acetate, acid value 1.5-3.8 mg KOH/g (ISO 3682), OH value 260-310 mg KOH/g (on solids)

Polyester 2—saturated polyester polyol with 4.7% OH calculated on non-volatiles, 79-81% non-volatile content, solvent butyl acetate, acid value 2.4-4.1 mg KOH/g (ISO 3682), OH value 140-170 mg KOH/g (on solids)

Desmodur® N3790—aliphatic polyisocyanate, high functional HDI trimer from Covestro Desmodur® N3500—aliphatic polyisocyanate, HDI allophanate trimer from Covestro Desmodur® N3400—aliphatic polyisocyanate (HDI uretdione) from Covestro, 40% blocked by uretdione formation Tolonate® HDT—isocyanurate HDI trimer from Vencorex Cymel® 350—highly methylated melamine (4 methoxymethyl groups, 2 methylol groups) from Allnex Lumiflon® LF710F—FEVE resin from AGC Chemicals, OH value 46 mg KOH/g solids, acid value 0 mg KOH/g solids.

DBTDL—dibutyltin dilaurate

Nacure® 5414—polymeric blocked sulfonic acid ester catalyst from King Industries

Example 1

Gray pigmented liquid was prepared according to Table 1.

TABLE 1

| Component | Weight parts |
|---|---|
| Polyester 1 | 25.57 |
| Defoamers | 2.44 |
| Dispersion Aids | 0.98 |
| Solvent* | 2.33 |
| TiO₂ | 33.10 |
| UV Inhibitors | 2.56 |

13

TABLE 1-continued

| Component | Weight parts |
|---|---|
| Carbon Black | 0.10 |
| Partially blocked isocyanate | 32.86 |
| DBTDL | 0.06 |
| Total | 100 |

*mixture of n-butyl acetate and Aromatic 100

The isocyanate component is Desmodur N3790 isocyanate that has been partially blocked with c- caprolactam to have a blocked/unblocked NCO ratio of 30:70.

The liquid was cast onto release coated polyester release carrier REL 8752 from St. Gobain in a continuous web coating process with multiple zone drying/curing oven with maximum temperature 280° F. (138° C.), to obtain a composite surfacing film on a release carrier. This reacted the unblocked isocyanate groups with a part of the hydroxyl groups on the polyester giving a partially cured film. The partially cured film had a thickness of 75 microns and could be easily removed from the release carrier and handled as a free film. The $T_g$ of the partially cured film was about 30° C. (measured via m-DSC). This surfacing film was laid up in a flat mold and overlaid by a carbon fiber/epoxy resin prepreg from MCCFC (Mitsubishi Chemical Carbon Fiber and Composites). The surfacing film is positioned against the tool side of the mold. The composite was cured for 2 hours at 350° F. (176° C.) in an autoclave at minimum 45 psi (0.3 MPa).

After curing, the surfacing film showed excellent appearance with no evidence of surface imperfections in the composite. The $T_g$ of the cured surfacing film was about 60° C. The surfaced composite had a pencil hardness of 6H before and after Skydrol® fluid testing and showed excellent resistance to benzyl alcohol-based paint stripper.

Example 2

A surfacing film was prepared the same as in Example 1 but with main binder components Polyester 1 and Polyester 2 at a weight ratio of 1.3:1 and Desmodur N3400 isocyanate (theoretically 40% blocked because of the uretdione content). The $T_g$ of the partially cured film was about 15° C. A BOPP release liner was interleafed with the surfacing film after partial curing to prevent blocking.

The surfacing film was laid up in a carbon fiber/epoxy resin composite process as described in Example 1. After curing, the surfacing film showed excellent appearance with no evidence of surface imperfections in the composite. The $T_g$ of the cured surfacing film was about 30° C. The cured surfacing film showed excellent resistance to thermal moisture cycle induced cracking, and excellent overlap adhesion in the seams of the surfacing film.

Example 3

A surfacing film was prepared the same as in Example 1 but with main binder components Polyester 1 and Desmodur N3400 isocyanate. The $T_g$ of the partially cured film was about 8° C. A BOPP release liner was interleafed with the surfacing film after partial curing to prevent blocking. The surfacing film was laid up in a carbon fiber/epoxy resin composite process as described in Example 1. After curing, the surfacing film showed excellent appearance with no evidence of surface imperfections in the composite. The $T_g$ of the cured surfacing film was about 50° C. The surfaced composite had a pencil hardness of 6H before and after Skydrol® fluid testing, and excellent resistance to thermal moisture cycle induced cracking. The properties were an optimal blend of the resulting surfacing properties in Examples 1 and 2.

Example 4

The surfaced composite as prepared in Example 3 had sections lightly sanded with 400 grit sandpaper and degreased. Another section was not sanded but only degreased. All sections were topcoated with aircraft exterior grade topcoat finish Akzo Nobel Aerospace Aerodur® 3001/3002 BC/CC system, no primer coat was used. Dry and wet adhesion to the surfaced composite tested according to ASTM D3359, was excellent. The finished composite showed excellent appearance with no surface defects.

Example 5

A surfacing film was prepared according to Table 2.

| Component | Weight parts |
|---|---|
| Polyester 1 | 49.81 |
| Defoamers | 1.14 |
| Dispersion Aids | 1.97 |
| Solvent* | 1.87 |
| Nacure 5414 | 1.62 |
| UV Inhibitors | 5.28 |
| Unblocked isocyanate | 20.11 |
| Cymel 350 | 18.07 |
| DBTDL | 0.13 |
| Total | 100 |

The isocyanate component is unblocked Tolonate® HDT isocyanate and the thermally activatable curing agent, which is Cymel® 350 melamine resin was used (weight ratio of melamine to polyol 25:75). The composition does not comprise pigments in order to obtain a transparent surfacing film. A transparent surfacing film is useful for applications in exposed carbon fiber weave. The isocyanate component reacts in the film casting step while the melamine is left to react in the composite curing step. The $T_g$ of the partially cured film was about 0° C. A BOPP release liner was used as an interleaf to prevent blocking. The surfacing film was laid up in a carbon fiber/epoxy resin composite as above, except the composite was cured 2 hours at 280° F. (137° C.).

After curing the surfacing film showed excellent appearance with no evidence of surface imperfections in the composite. The $T_g$ of the cured surfacing film was about 40° C. The surfaced composite showed excellent resistance to UV damage and had 100% residual gloss after 700 hours QUV-B testing compared to 20% residual gloss for a bare epoxy reinforced carbon fiber composite.

Example 6

The surface composite as prepared in Example 5 was lightly sanded with 400 grit sandpaper and degreased, then topcoated with marine grade Akzo Nobel Awlgrip® F3029 polyurethane clearcoat. The visual appearance of the carbon fiber composite was outstanding—no defects in a high gloss clear application.

15

Example 7

Gray pigmented, solvent containing liquid was prepared according to Table 3.

TABLE 3

| Component | Weight parts |
| --- | --- |
| Polyester 1 | 19.55 |
| Defoamers | 1.86 |
| Dispersion Aids | 0.75 |
| Solvent* | 2.47 |
| TiO$_2$ | 25.31 |
| UV Inhibitors | 1.95 |
| Carbon Black | 0.08 |
| Unblocked isocyanate | 3.11 |
| Blocked isocyanate | 44.85 |
| DBTDL | 0.07 |
| | |
| Total | 100 |

*mixture of n-butyl acetate and Aromatic 100

The isocyanate component contained Desmodur N3500 isocyanate that had been partially blocked with c-capro-lactam to have a blocked/unblocked NCO ratio of 75:25, and the Desmodur N3400 isocyanate with 40% theoretical internal blocking (uretdione). This formulation has an effective blocked to unblocked NCO content of 70:30 with an overall NCO:OH index of 1.9:1.

The formulation was cast onto a 100 micron blue tinted PET with a polymeric release coating in a continuous web coating process with multiple zone drying/curing ovens with maximum temperature 280° F. (138° C.). This reacted the unblocked NCO groups with some of the hydroxyl groups on the polyester giving a partially reacted film. A 50 micron red PE release liner was interleafed with the partially cured film to prevent blocking. The partially cured film had a thickness of 50 microns and could be easily removed from the release carrier and handled as a free film. The T$_g$ of the partially cured film was about 13° C. (measured via m-DSC).

The surfacing film was laid up in a prepreg carbon fiber / epoxy resin composite process positioned with the surfacing film against the tool side of the mold. The composite was cured 4 hours at max 350° F. (176° C.) in an autoclave at minimum 45 psi (0.3 MPa). After curing, the surfacing film showed excellent appearance with no evidence of surface imperfections in the composite. The T$_g$ of the cured surfacing film was about 70° C. The surfaced composite had a pencil hardness of 4H before and after Skydrol® fluid testing and showed excellent resistance to benzyl alcohol paint stripper.

Example 8

A surfacing film was made as represented in Example 7. A pigmented tack layer was prepared containing as the main binder components Polyester 1, the Desmodur N3400 isocyanate component, and the Desmodur BL3272 isocyanate component, which is fully blocked with c-caprolactam. This formulation has an effective blocked to unblocked NCO content of 90:10 with an overall NCO:OH index of 1.4:1. This formulation was cast onto a 50 micron biaxially-oriented polypropylene (BOPP) release liner in a continuous web coating process with multiple zone drying/curing ovens with maximum temperature 220° F. (104° C.). The T$_g$ of this partially cured film was about −3° C. (measured via m-DSC) and had a thickness of 25 microns.

This tack layer was in-line laminated to the surfacing film layer as prepared in Example 7 to create a bilayer surfacing film with tack on one side. The surfacing film was laid up in a prepreg carbon fiber / epoxy resin composite process positioned with the tack layer of the surfacing film against the carbon fiber prepreg. This film showed excellent tack and drapability in the layup process. The composite was cured 4 hours at max 350° F. (176° C.) in an autoclave at minimum 45 psi (0.3 MPa).

After curing, the surfacing film showed excellent appearance with no evidence of surface imperfections in the composite. The T$_g$ of the cured surfacing film was about 70° C. The surfaced composite had a pencil hardness of 4H before and after Skydrol® fluid testing and showed excellent resistance to benzyl alcohol paint stripper.

Example 9

A surfacing film was made as represented in Example 7. A pigmented tack layer was prepared according to Table 4.

TABLE 4

| Component | Weight parts |
| --- | --- |
| Polyester 1 | 16.08 |
| Defoamers | 0.27 |
| Dispersion Aids | 1.59 |
| Solvent* | 19.44 |
| TiO$_2$ | 14.60 |
| UV Inhibitors | 1.23 |
| Carbon Black | 0.05 |
| Filler | 18.78 |
| Blocked isocyanate | 27.96 |
| | |
| Total | 100 |

*mixture of n-butyl acetate and Aromatic 100

The isocyanate component is Desmodur N3500 isocyanate, which was fully blocked with ε-caprolactam. This formulation has an NCO:OH index of 1:1. This formulation was cast onto a 50 micron biaxially-oriented polypropylene (BOPP) release liner in a continuous web coating process with multiple zone drying/curing ovens with maximum temperature 220° F. (104° C.). The T$_g$ of this partially cured film was about 0° C. (measured via m-DSC) and had a thickness of 25 microns.

This tack layer was in-line laminated to the surfacing film layer as prepared in Example 7 along with a 12 g/m$^2$ polyester non-woven fabric to create a triplex surfacing film with tack on one side and embedded scrim support. The surfacing film was laid up in a prepreg carbon fiber/epoxy resin composite process positioned with the tack layer of the surfacing film against the tool side of the mold. This film showed excellent tack, drapability, and tear resistance in the layup process. The composite was cured 4 hours at max 350° F. (176° C.) in an autoclave at minimum 45 psi (0.3 MPa).

After curing, the surfacing film showed excellent appearance with no evidence of surface imperfections in the composite. The T$_g$ of the cured surfacing film was about 70° C. The surfaced composite had a pencil hardness of 4H before and after Skydrol® fluid testing and showed excellent resistance to benzyl alcohol paint stripper.

Example 10

Comparison to an Epoxy-Amine Surfacing Film

A surfacing film was prepared as in Example 7 and compared to a standard commercially available epoxy-amine based surfacing film Surfacemaster 905 from Solvay for tensile strength, melt viscosity, and UV transmission / reflectance.

Tensile strength was measured according to ASTM D882 using an Instron® tensile tester. The surfacing film according to Example 7 (with no reinforcing layer) showed a tensile yield strength of 400-500 psi (2.8-3.4 MPa), maximum tensile strength (at break) of 1200-1400 psi (8.3-9.7 MPa), and an elongation at break of 70-100%. At room temperature, the surface film exhibited viscoelastic behavior (elastic recovery below the yield strength) with a brittle failure at the break point. The epoxy-amine surfacing film exhibited significant deformation and ductile failure under any amount of applied stress and showed no elastic recovery. The maximum tensile strength and the yield strength were both less than 100 psi (0.7 MPa). Due to the significant deformation and ductile failure, the elongation at break could not be measured.

Melt viscosity was measured at 180° F. (82° C.) according to ASTM D445 for the epoxy-amine surfacing film. The film exhibited fluid behavior with a viscosity range of 5,000-10,000 mPa-s up until the onset of cure temperature at 240-266° F. (115-130° C.) as measured by m-DSC. The surfacing film according to Example 7 did not show any fluid behavior at 180° F. (82° C.) or any elevated temperature up to the onset of cure temperature at 338-356° F. (170-180° C.) as measured by m-DSC. UV transmission and reflectance are measured using a UV/Vis spectrophotometer. Scans were done from wavelengths of 280 nm-800 nm. The surfacing film according to Example 7 showed 0% transmission over the entire wavelength range. Table 5 summarizes percent UV transmission and reflectance for the wavelength range which can be damaging to organic coatings and composite substrates (320 nm-420 nm).

TABLE 5

| | % UV Transmission | | % UV Reflectance | |
| Wavelength, nm | Epoxy-amine film | Example 7 film | Epoxy-amine film | Example 7 film |
| --- | --- | --- | --- | --- |
| 320 | 9.8 | 0.0 | 48.5 | 97.3 |
| 330 | 5.1 | 0.0 | 32.4 | 67.9 |
| 340 | 7.7 | 0.0 | 24.6 | 54.2 |
| 350 | 12.6 | 0.0 | 18.0 | 40.5 |
| 360 | 16.7 | 0.0 | 12.8 | 30.2 |
| 370 | 21.2 | 0.0 | 10.0 | 24.8 |
| 380 | 26.2 | 0.0 | 8.8 | 24.0 |
| 390 | 30.9 | 0.0 | 8.4 | 28.5 |
| 400 | 35.2 | 0.0 | 8.8 | 42.4 |
| 410 | 39.0 | 0.0 | 9.1 | 55.8 |
| 420 | 42.4 | 0.0 | 9.5 | 58.8 |

Example 11

Gray pigmented, solvent containing liquid was prepared according to Table 6.

TABLE 6

| Component | Weight parts |
| --- | --- |
| Lumiflon LF710F | 25.01 |
| Defoamers | 1.97 |
| Dispersion Aids | 1.44 |
| Solvent* | 18.42 |
| TiO$_2$ | 19.62 |
| DBTDL | 0.12 |
| Nacure 5414 | 0.94 |

TABLE 6-continued

| Component | Weight parts |
| --- | --- |
| Carbon Black | 0.03 |
| Cymel 350 | 6.55 |
| Ceramic microspheres** | 23.68 |
| Unblocked isocyanate | 2.22 |
| Total | 100 |

*mixture of n-butyl acetate and Aromatic 100,
**G-200, Zeeospheres

The isocyanate component is Desmodur N3500 unblocked isocyanate. This formulation was cast onto release coated polyester carrier in a continuous web coating process with multiple zone drying/curing oven with maximum temperature 280° F. (138° C.). This reacted the -NCO groups with some of the hydroxyl groups on the FEVE giving a partially reacted urethane film. The partially cured film had a thickness of 75 microns and could be easily removed from the release carrier and handled as a free film. The T$_g$ of the partially cured film was about 20° C. (measured via m-DSC).

This surfacing film was laid up in a prepreg fiberglass/phenolic composite process positioned with the surfacing film against the tool side of the mold. The composite sandwich construction contained 1 ply of PHG600-48-50 (Gurit® prepreg), a honeycomb core ABS 5035 9.4 mm (Plascore® honeycomb), and another ply of PHG600-48-50. The composite was cured 2 hours at 280° F. (138° C.) in an autoclave at minimum 45 psi (0.3 MPa).

After curing, the surfacing film showed excellent appearance with good filling properties on the surface of the composite. The T$_g$ of the cured surfacing film was about 70° C. The surfaced composite had a pencil hardness of 6H after curing. The surfaced composite was tested for fire, smoke, and toxicity according to FAR 25.853 (a) and (d) and AITM 3.0005. The results are shown in Table 7.

TABLE 7

| Test | Results |
| --- | --- |
| 60 sec vertical burn | |
| Burn length [mm] | 44 |
| After flame time [s] | 0 |
| After flame time of drips [s] | 0 |
| Optical Smoke Density, flaming mode within 4 min | 15.25 |
| Smoke Toxicity Concentration [ppm], flaming mode within 4 minutes | |
| HCN | <0.5 |
| CO | 182.5 |
| NO/NO$_2$ | 6.95 |
| SO$_2$/H$_2$S | 0 |
| HF | 0 |
| HCl | 0 |
| Heat Release | |
| Heat release rate - max within 5 min [kW/m$^2$] | 36.22 |
| Heat release - within 2 min [kWmin/m$^2$] | 43.8 |

The invention claimed is:

1. A thermally curable multi-layer film comprising:
(a) a release carrier,
(b) a surfacing film layer overlying the release carrier, wherein the surfacing film layer comprises an OH-functional polyurethane, and a thermally activatable curing agent which can react with the OH groups at a temperature higher than 120° C., wherein the thermally activatable curing agent comprises a blocked isocyanate or an amino resin, and (c) a release liner.

2. The multi-layer film according to claim 1, wherein the OH-functional polyurethane is prepared from a polyester polyol or from a fluoroethylene vinyl ether.

3. The multi-layer film according to claim 1, wherein the OH-functional polyurethane does not possess reactive unsaturated bonds.

4. The multi-layer film according to claim 1, wherein the surfacing film layer further comprises a conductive pigment or conductive filler.

5. The multi-layer film according to claim 1, further comprising a tack layer overlying the surfacing film layer on the side opposite to the release carrier.

6. The multi-layer film according to claim 5, wherein the tack layer has a glass transition temperature equal to or less than $0°$ C., as measured by modulated differential scanning calorimetry (m-DSC).

7. The multi-layer film according to claim 1, wherein the multi-layer film comprises a scrim fabric.

8. The multi-layer film according to claim 7, wherein the scrim fabric comprises a conductive fiber material.

9. A method for producing the multi-layer film of claim 1, the method comprising the steps of:

(a) casting the surfacing film layer onto the release carrier, (b) drying the surfacing film layer, and (c) laminating the release liner on the side opposite to the release carrier.

10. A method for preparing a composite article in-mold using a prepreg and the multi-layer film of claim 1, comprising the steps of:

(a) removing the release carrier and the release liner from the multi-layer film, (b) laying up the film in a mold against a tooling side of the mold, (c) laying up a prepreg over the film, (d) thermally curing both the prepreg and the film in the mold to form a coated cured composite article, and (e) taking out the coated cured composite article from the mold.

11. A composite article obtained according to the method of claim 10.

* * * * *